UNITED STATES PATENT OFFICE.

HENRY B. GOODYEAR, ADMINISTRATOR OF NELSON GOODYEAR, OF NEW YORK, N. Y.

IMPROVEMENT IN THE MANUFACTURE OF INDIA-RUBBER FABRICS.

Specification forming part of Letters Patent No. 4,047, dated May 13, 1845; Reissue No. 812, dated September 13, 1859.

*To all whom it may concern:*

Be it known that NELSON GOODYEAR, deceased, did, in his lifetime, invent a new and useful Improvement in the Manufacture of India-Rubber Fabrics, of which the following is a full, clear, and exact description.

The invention of the said NELSON GOODYEAR, deceased, relates to an improvement in the production of fabrics of india-rubber or allied gum and the clippings or the shearings of wool, cotton, silk, hair, fur, and other fibrous substances; and it consists in making such fabrics by thoroughly intermingling and incorporating such clippings or shearings of fibrous substances with india-rubber or allied gum or the preparations thereof, while the gum is in the plastic state, by heat, so that the fabric, when produced, shall be throughout composed of the gum and such clippings or shearings of fibrous substances thoroughly commingled.

To enable others skilled in the art of working india-rubber and allied gums, I will describe the preferred mode of procedure practiced by the said NELSON GOODYEAR.

Take a plain piece of common cloth and coat it with a thin sheet of the prepared gum by passing through the heated calender-rollers in the usual manner well known to india-rubber manufacturers, and while the gum is still in the plastic state a coating of the said fibrous substance is spread all over it, and again passed through the calenders with sufficient pressure to force the fibers completely into the thin sheet of gum. In like manner another thin sheet of the prepared gum is then applied to this surface, and another of the fibers, and so on in succession until the required thickness has been obtained, taking care at each operation to make the sheet of gum so thin and to apply such a degree of pressure to the fibrous substance laid thereon as to insure a thorough incorporation of the fibrous substances with the plastic gum; or, instead of the above mode, any of the fibrous substances above indicated may be thoroughly incorporated with the prepared gum by subjecting them together to the operation of the well-known heated grinders usually employed by india-rubber manufacturers, and after they are completely incorporated the compound is rolled into sheets of the required thickness by the calender-rollers, and whether amalgamated in either of the above modes or in any other mode and rolled into sheets, the substance thus produced is to be treated in the usual manner of preparing india-rubber cloth; the object of the said invention being to impart to the manufacture, when completed, an even and smooth surface and leather-like appearance and a more firm texture than can be obtained by any other known mode of treating india-rubber and allied gums.

A leading object of the said invention is in producing a strong firm fabric, to reduce the cost of production by utilizing waste fibrous substances—such as the waste shearings of cloth and the clippings of various kinds of cloth coated with india-rubber or allied gums, and produced in cutting and shaping fabrics coated with such gums, the fibers of such clippings being reduced to the required condition by grinding between the heated grinding rollers, and at the same time thoroughly commingled with the gum while in the plastic state.

I am aware that prior to the said invention of the said NELSON GOODYEAR fabrics were produced by Charles Goodyear of india-rubber and fibers; but in such case the fabric was composed of alternate layers of gum and bats of carded fibers pressed into the gum to a depth sufficient to simply cause the bats to adhere to the sheets of gum. The objections to this were the cost of such fibers and the preparation of them, and the difficulty of thoroughly incorporating them with the gum, as the first application of pressure to the bats of fibers so compacts them that the gum applied in the plastic state cannot so penetrate as to effect that incorporation of the fibers and gum which is necessary to the production of the kind of fabric produced by the said invention of the said NELSON GOODYEAR; and I am also aware that it has been proposed to make fabrics by taking the fibers of flax, hemp, and other substances, and, after cutting to a length of about one-eighth of an inch, making bats of them by applying thereto india-rubber dissolved in some of the essential oil; but this too failed to produce the result obtained by the said invention of the said NELSON GOODYEAR. I do not, therefore, wish to be understood as making claim, broadly, to the manufacture of india-rubber cloth by combining fibers with the gum; but What I do claim as the invention of the said NELSON GOODYEAR, deceased, is—

Making fabrics by thoroughly intermingling and incorporating the shearings or clippings of fibrous substances with the gum while rendered plastic by heat, substantially as and for the purpose specified.

H. B. GOODYEAR,
*Administrator of the Estate of Nelson Goodyear, Deceased.*

Witnesses:
GEO. D. SARGEANT,
ANDREW DE LACY.